(12) United States Patent
Hodge

(10) Patent No.: US 12,300,999 B2
(45) Date of Patent: *May 13, 2025

(54) CONTRABAND DETECTION THROUGH SMART POWER COMPONENTS

(71) Applicant: **Global Tel*Link Corporation**, Reston, VA (US)

(72) Inventor: Stephen L. Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,199

(22) Filed: Jun. 15, 2023

(65) Prior Publication Data

US 2023/0411994 A1 Dec. 21, 2023

Related U.S. Application Data

(63) Continuation of application No. 17/706,372, filed on Mar. 28, 2022, now Pat. No. 11,682,922, which is a
(Continued)

(51) Int. Cl.
*H02J 13/00* (2006.01)
*H01R 13/66* (2006.01)
(Continued)

(52) U.S. Cl.
CPC ........ *H02J 13/0005* (2020.01); *H01R 13/665* (2013.01); *H02J 7/00* (2013.01);
(Continued)

(58) Field of Classification Search
CPC ........ H01R 13/66–7197; H01R 31/065; G06F 1/26; G06F 1/266; H02J 13/00032;
(Continued)

(56) References Cited

U.S. PATENT DOCUMENTS 7,257,466 B2 8/2007 Kreiner
8,471,415 B1 6/2013 Heninwolf
(Continued)

FOREIGN PATENT DOCUMENTS

WO WO 2017/029424 A1 2/2017

OTHER PUBLICATIONS

International Search Report and Written Opinion of the International Searching Authority directed to related International Patent Application No. PCT/US2018/052011, mailed Dec. 13, 2018; 9 pages.

*Primary Examiner* — Elim Ortiz
*Assistant Examiner* — David A Shiao
(74) *Attorney, Agent, or Firm* — Sterne, Kessler, Goldstein & Fox P.L.L.C.

(57) ABSTRACT

A method and system for contraband detection is provided that allows for the determining whether devices are authorized to receive power from an outlet. A power adapter and/or an outlet authenticate a device when it is connected to the outlet through the power adapter. On the basis of this authentication, a determination is made whether the devices are to receive power from the outlet. If the device is authorized, the outlet is activated, transitioning from inactive state (where no power is relayed through the outlet) to an active state (where power is relayed through the outlet).

20 Claims, 7 Drawing Sheets

Related U.S. Application Data continuation of application No. 16/821,222, filed on Mar. 17, 2020, now Pat. No. 11,289,943, which is a continuation of application No. 16/155,518, filed on Oct. 9, 2018, now Pat. No. 10,594,090, which is a continuation of application No. 15/710,203, filed on Sep. 20, 2017, now Pat. No. 10,096,951.

(51) Int. Cl.
*H02J 7/00* (2006.01)
*H01R 13/70* (2006.01)
*H01R 25/00* (2006.01)
*H01R 31/06* (2006.01)

(52) U.S. Cl.
CPC ............ *H01R 13/70* (2013.01); *H01R 25/006* (2013.01); *H01R 31/065* (2013.01); *H02J 7/00045* (2020.01)

(58) Field of Classification Search
CPC ............ H02J 13/00036; H02J 13/0005; H02J 2310/12; H02J 2310/70
See application file for complete search history.

(56) References Cited

U.S. PATENT DOCUMENTS

| | | | |
|---|---|---|---|
| 9,219,361 B1 | 12/2015 | Wine et al. | |
| 10,096,951 B1 | 10/2018 | Hodge | |
| 10,594,090 B2 | 3/2020 | Hodge | |
| 11,289,943 B2 | 3/2022 | Hodge | |
| 2005/0184856 A1 | 8/2005 | Pourchot | |
| 2008/0154387 A1 | 6/2008 | Nambu | |
| 2009/0192927 A1 | 7/2009 | Berg et al. | |
| 2009/0263999 A1 | 10/2009 | Onoue | |
| 2010/0080563 A1 | 4/2010 | DiFonzo et al. | |
| 2010/0145542 A1 | 6/2010 | Chapel et al. | |
| 2010/0241560 A1 | 9/2010 | Landau-Holdsworth et al. | |
| 2011/0015795 A1 | 1/2011 | Boyer et al. | |
| 2012/0086546 A1 | 4/2012 | Montgomery et al. | |
| 2013/0006430 A1* | 1/2013 | Tomiyama | H02J 13/00028 700/286 |
| 2013/0122754 A1 | 5/2013 | Golko et al. | |
| 2013/0314069 A1 | 11/2013 | Suzuki | |
| 2014/0075061 A1 | 3/2014 | Fritchman et al. | |
| 2014/0285318 A1 | 9/2014 | Audeon et al. | |
| 2015/0244121 A1 | 8/2015 | Amelio et al. | |
| 2015/0249337 A1* | 9/2015 | Raneri | H01R 13/6683 307/24 |
| 2016/0119310 A1 | 4/2016 | Marlin et al. | |
| 2017/0310109 A1* | 10/2017 | Bollinger, Jr. | H01Q 1/38 |
| 2017/0324195 A1 | 11/2017 | Eriksen et al. | |
| 2018/0366954 A1* | 12/2018 | Scanzillo | H02J 7/345 |
| 2022/0285981 A1 | 9/2022 | Hodge | |

* cited by examiner

CONTRABAND DETECTION THROUGH SMART POWER COMPONENTS

CROSS REFERENCE TO RELATED APPLICATIONS

This application is a continuation of U.S. Nonprovisional patent application Ser. No. 17/706,372, filed Mar. 28, 2022, now U.S. Pat. No. 11,682,922, issued Jun. 20, 2023, which is a continuation of U.S. Nonprovisional patent application Ser. No. 16/821,222, filed Mar. 17, 2020, now U.S. Pat. No. 11,289,943, issued Mar. 29, 2022, which is a continuation of U.S. Nonprovisional patent application Ser. No. 16/155,518, filed Oct. 9, 2018, now U.S. Pat. No. 10,594,090, issued Mar. 17, 2020, titled "Contraband Detection Through Smart Power Components," which is a continuation of U.S. Nonprovisional patent application Ser. No. 15/710,203, filed Sep. 20, 2017, now U.S. Pat. No. 10,096,951, titled "Contraband Detection Through Smart Power Components," the contents of which are hereby incorporated herein by reference in their entireties.

BACKGROUND

Field

This disclosure relates to detecting contraband devices through smart power components.

Background

In a controlled environment, such as a prison, there is a need for administrators to control and manage usage of devices within the environment. Residents of the controlled environment, such as inmates, use such devices to communicate with parties outside of the controlled environment, to connect with the Internet, or to consume content, to name a few examples of device usage. Controlled environments implement strict rules and policies governing how these devices are to be used and typically will approve any devices that may be used by, for example, providing residents with pre-approved devices that have been customized to comply with the strict rules and policies or installing management software on such devices that restrict or allow specific approved actions.

In order to avoid compliance, residents smuggle in contraband (e.g., unapproved) devices into the controlled environment which allow the residents to perform unapproved and unauthorized activities such as communicating with unauthorized outside parties, downloading unauthorized content, and/or browsing unauthorized web sites. Current methods for detecting these contraband devices are cumbersome and are not effective in preventing their usage while within the controlled environment.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
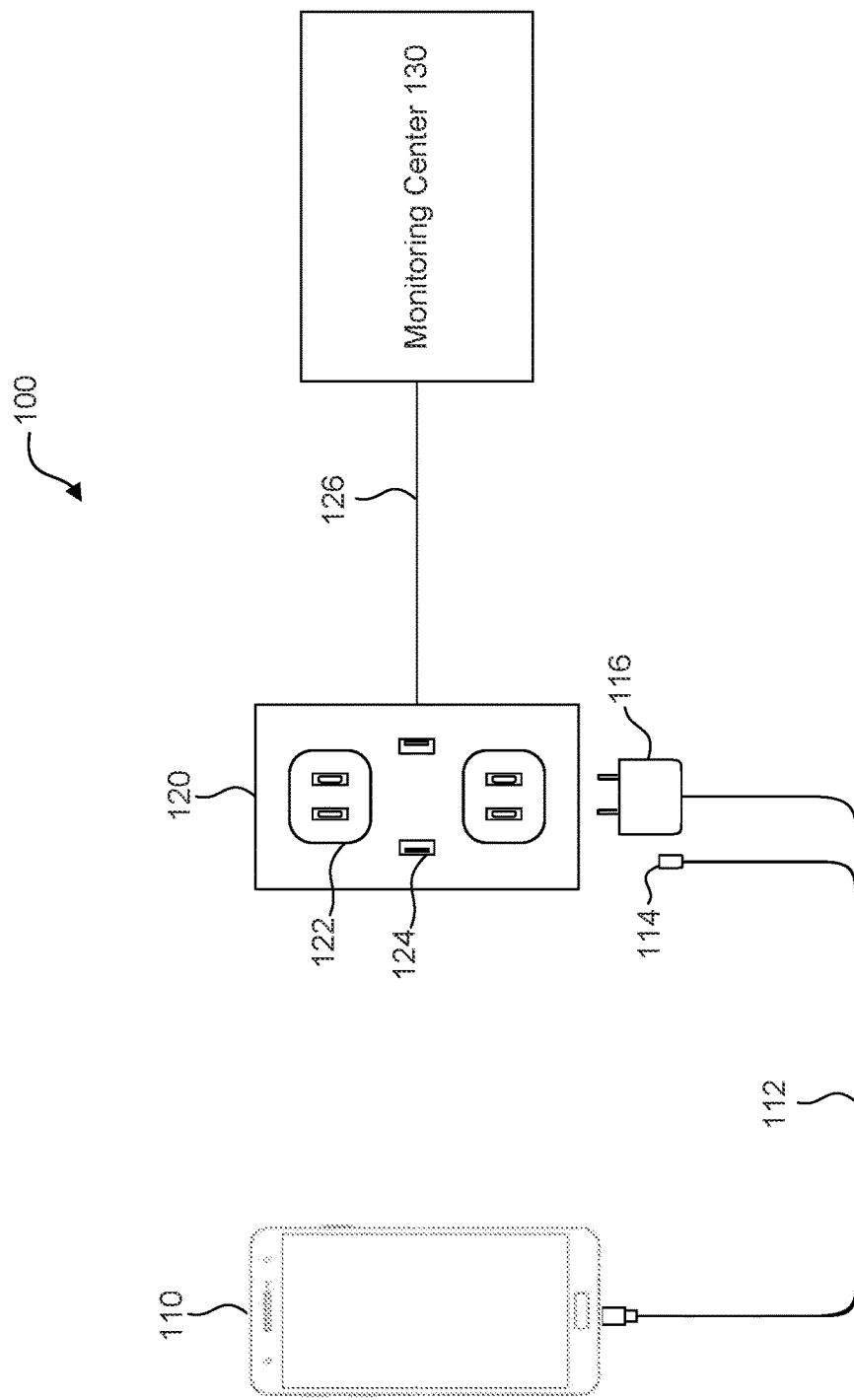
FIG. 1 illustrates a diagram of an exemplary contraband detection system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Accordingly, there is a need for contraband detection and prevention within a controlled environment. Embodiments of this disclosure provide a method and devices for detecting contraband devices and preventing such devices from receiving power from any power adapter and/or outlet within the controlled environment. In some embodiments, detection of contraband devices may also result in transmission of an alert message indicating the presence and/or location of the detected contraband devices to appropriate administrators, such as a monitoring center, of the controlled environment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or customize for various applications such exemplary embodiments, without undue experimentation, without departing from the spirit and scope of the disclosure. Therefore, such modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Exemplary Contraband Detection System

FIG. 1 illustrates a diagram of an exemplary contraband detection system 100, according to embodiments of the present disclosure. In some embodiments, contraband detection system 100 is deployed within a controlled environment such as a prison where enforcement of rules and policies associated with device usage is necessary. A contraband device is any device that is not authorized for use or is authorized for only limited use (e.g., only allowed to receive power from certain outlets or can only receive power during specific periods of the day) within the controlled environment. In some embodiments, contraband detection system 100 includes a device 110 that is to be powered within the controlled environment and power cable 112 that, in some embodiments, includes USB connector 114 and, in some embodiments, includes a smart power adapter 116, a smart outlet 120 that, in some embodiments, includes electrical outlet 122 and USB connector 124, and connection 126 between smart outlet 120 and monitoring center 130. Only one device 110, one power cable 112, one smart outlet 120, and one monitoring center 130 are depicted in FIG. 1 for simplicity. It is understood that contraband detection system 100 may include more than one of device 110, one power cable 112, one smart outlet 120, and one monitoring center 130.

In some embodiments, device 110 is a mobile device that is implemented as a smartphone. Other types of devices are within the scope of the invention for device 110 such as cellular phones, tablets, laptops, and wearable devices and contraband detection system 100 includes more than one device 110 that is depicted in FIG. 1. In some embodiments, device 110 is an electronic device that requires charging from an electrical outlet and that has been smuggled into a controlled environment, such as a prison. In some embodiments, device 110 includes components installed by the controlled environment that allow for the management and control of device 110. Examples of components include but are not limited to specialized software that communicates information through power cable 112 when device 110 is connected to power cable 112. In some embodiments, the specialized software is an application that responds to queries from smart power adapter 116, smart outlet 120, and/or monitoring center 130. Responses to these queries include information associated with device 110. For example, the information includes but is not limited identification information that uniquely identifies device 110 such as a randomly generated identifier or an identifier assigned to device 110 and/or a user (e.g., an inmate) of device 110.

In embodiments involving a controlled environment, monitoring center 130 automatically downloads the specialized software onto device 110. In some embodiments, the controlled environment conditions usage of device 110 within the controlled environment on the installation of the software. In some embodiments, in addition to generating and/or providing unique identification information associated with device 110, the specialized software also allows the controlled environment to otherwise manage and control operations of device 110 such as determining whether device 110 is authorized to receive power through any adapters or outlets within the controlled environment, such as smart power adapter 116 and smart outlet 120, respectively. Accordingly, contraband devices will not include such specialized software and will not be able to respond to any queries or otherwise provide an identifier to smart power adapter 116, smart outlet 120, and/or monitoring center 130. In some embodiments, the absence of an appropriate response to a query (which may be transmitted from smart power adapter 116, smart outlet 120, and/or monitoring center 130) is an indication that device 110 is not authorized to receive power.

In some embodiments, power cable 112 includes at least one mechanism for connecting to smart outlet 120 such as USB connector 114 and smart power adapter 116. In some embodiments, smart power adapter 116 includes contraband detection components for determining whether device 110 is authorized to receive power from an outlet within the controlled environment, such as smart outlet 120. In some embodiments, within a controlled environment, authorization for receiving power is determined by comparing identification information received from device 110 with a list of authorized identifiers associated with devices that have been approved (e.g., by monitoring center 130) to receive power through an outlet within the controlled environment (e.g., smart outlet 120). In some embodiments, authorization for receiving power includes the step of transmitting the identification information to smart outlet 120 and/or monitoring center 130 and receiving a contraband response from smart outlet 120 and/or monitoring center 130. In some embodiments, the contraband response indicates whether device 110 is authorized to receive power within the controlled environment. Smart power adapter 116 includes external prongs for connecting to electrical receptacles of smart outlet 120.

In some embodiments, power cable 112 is capable of receiving power for charging a battery and/or otherwise powering device 110 as well as transmitting data from device 110 to an external device such as smart power adapter 116, smart outlet 120, and/or monitoring center 130, and vice versa. Examples of data that can be transmitted through power cable 112 include but are not limited to device identification information, queries for such identification information, acknowledgement messages (ACKs), and negative acknowledgement messages (NACKs).

In some embodiments, smart outlet 120 includes USB connector 124 for receiving USB connector 114 attached to power cable 112 and electrical outlet 122 for receiving smart power adapter 116 attached to power cable. In some embodiments, smart outlet 120 also includes contraband detection components for determining whether device 110 is authorized to receive power from smart outlet 120. In some embodiments, authorization for receiving power includes the step of transmitting the identification information to monitoring center 130 and receiving a contraband response monitoring center 130. In some embodiments, the contraband response indicates whether device 110 is authorized to receive power within the controlled environment. Smart power adapter 116 includes external prongs for connecting to electrical receptacles of smart outlet 120.

In some embodiments, connection 126 between smart outlet 120 and monitoring center 130 is capable of transmitting signaling information in conjunction with power between smart outlet 120 and monitoring center 130. Although only one connection is shown with respect to connection 126, it is understood that, in some embodiments, connection 126 comprises more than one connection between smart outlet 120 and monitoring center 130. For example, connection 126 comprises an electrical connection for relaying power as well as a wireless connection such as cellular (e.g., GSM, CDMA), Bluetooth or IEEE 802.11 (commonly known as Wi-Fi). Accordingly, smart outlet 120 communicates with monitoring center 130 over wired (e.g., electrical wiring) and/or wireless (e.g., Wi-Fi) communications.

In some embodiments, monitoring center 130 is associated with a controlled environment and, in some embodiments, coordinates with smart power adapter 116 and/or smart outlet 120 to ensure that device 110 is authorized to receive power while located within the controlled environment. In some embodiments, monitoring center 130 includes contraband detection components that allow monitoring center 130 to determine whether a device (e.g., device 110) is authorized to receive power from any outlet while the device is within the controlled environment. In some embodiments, monitoring center 130 also stores device profiles associated with devices that are allowed to receive power while located in the controlled environment.

As previously noted, contraband detection includes determining whether devices are authorized to receive power while the devices are located within the controlled environment. In some embodiments, determining whether devices are authorized includes performing a comparison of identification information associated with the devices with a list of authorized devices that identifies devices that have been approved (e.g., by administrators of the controlled environment, by monitoring center 130) for general operation including receiving power. Devices that attempt to receive power from any outlet, such as smart outlet 120, that are not authorized to function within the controlled environment will be prevented from receiving power from outlets.

In some embodiments, the contraband detection is performed by device 110 and smart components of contraband detection system: smart power adapter 116, by smart outlet 120, by monitoring center 130, or by any combination of these devices. In other words, contraband detection is possible as long as at least one smart power component within contraband detection system 100 is capable of detecting whether device 110 is a contraband device. For example, in some embodiments, a controlled environment only includes smart outlets (e.g., outlets that include contraband detection capability). In some embodiments, a controlled environment only includes smart power adapters and another controlled environment includes all a combination of all three. In such embodiments, contraband detection of devices is possible through any combination of these smart components as long as power to devices can be controlled through the outlet (e.g., by activating or deactivating the power components such as smart power adapter 116 and/or smart outlet 120).

When device 110 connects to any one of smart power adapter 116 or smart outlet 120, the transmission of the device identification information essentially acts as a request for power to be provisioned to device 110. Any one of smart power adapter 116, smart outlet 300, and/or monitoring center 130 determines whether device 110 is authorized to receive power by detecting whether device 110 is a contraband device. In some embodiments, contraband device also includes a device that is being utilized a user that is not authorized to utilize the device.

Exemplary Smart Power Adapter

Figure 2:
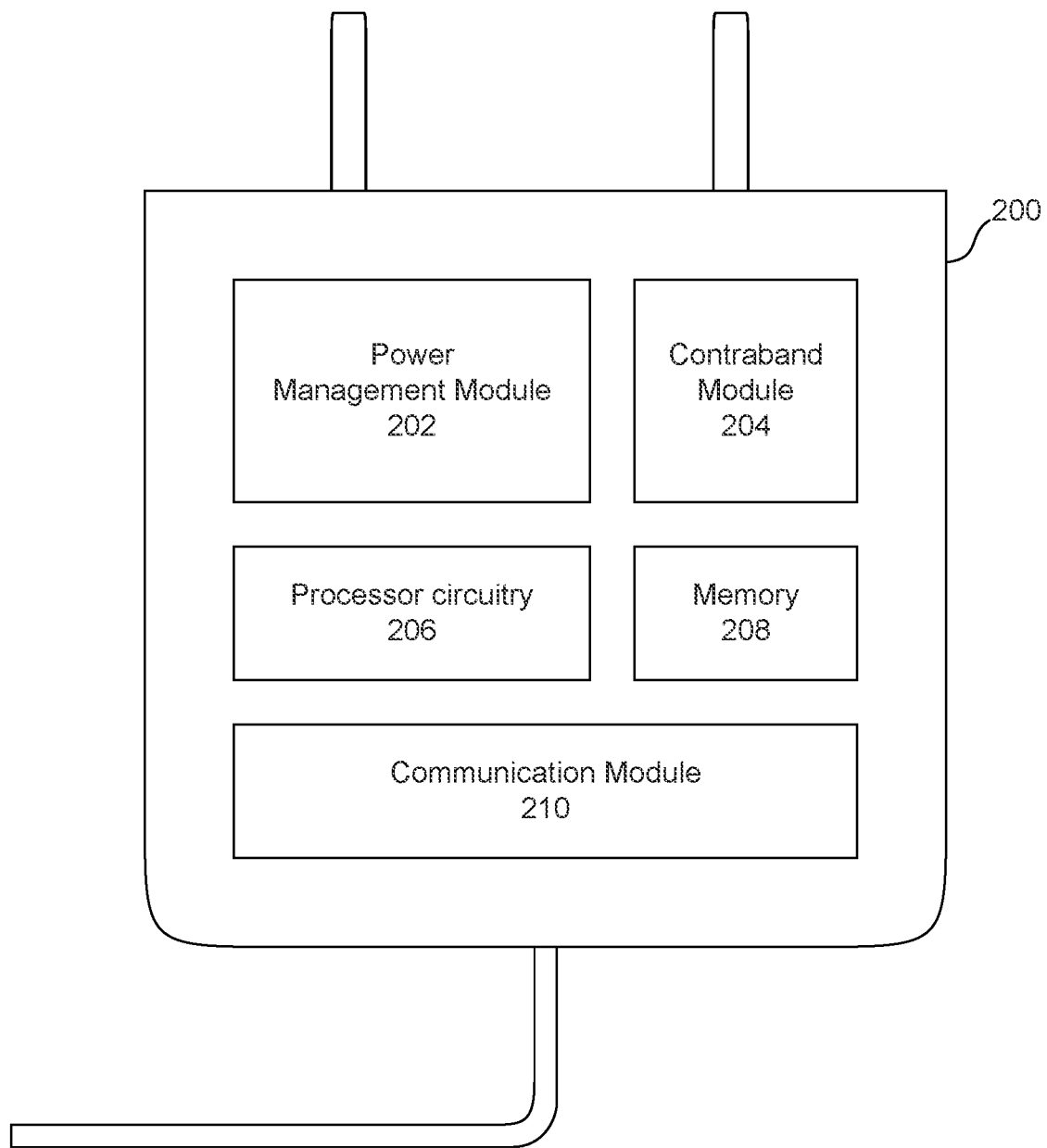
FIG. 2 illustrates a block diagram of an exemplary smart power adapter for use in the exemplary contraband detection system of FIG. 1, according to embodiments of the present disclosure.

FIG. 2 illustrates a block diagram of an exemplary smart power adapter 200 for use in the exemplary contraband detection system of FIG. 1, according to embodiments of the present disclosure. In some embodiments, smart power adapter 200 represents an exemplary embodiment of smart power adapter 116 as described in FIG. 1. In some embodiments, smart power adapter 200 includes power management module 202, contraband module 204, processor circuitry 206, memory 208, and communication module 210.

In some embodiments, power management module 202 is a component that manages the relay of power through smart power adapter 200 from an outlet such as smart outlet 120. In some embodiments, power management module 202 receives commands from processor circuitry 206, contraband module 204, and/or communication module 210 to allow for or prevent power to be relayed through smart power adapter 200.

In some embodiments, contraband module 204 is a component that performs contraband detection for any device, such as device 110 that connects to smart power adapter 200 and determines whether power should be relayed through smart power adapter 200. For example, when device 110 is connected to smart power adapter 200, such as by connecting power cable 112 to device 110, contraband module 204 receives identification information associated with the device 110 through power cable 112. In some embodiments, the identification information is transmitted automatically to contraband module 204 by a software application in device 110 (e.g., upon connecting device 110 and power cable 112). In some embodiments, the identification is transmitted by the software application in device 110 in response to a query from contraband module 204.

In some embodiments, contraband module 204 determines whether device 110 is authorized to receive power through any outlet based on the received identification information. In some embodiments, this determination is performed by contraband module 204. In some embodiments, smart power adapter 200 does not perform contraband detection (e.g., contraband module 204 is absent or not working) and forwards the identification information to another smart power component for contraband detection such as a smart outlet, such as smart outlet 120, or to a monitoring center, such as monitoring center 130, associated with the controlled environment.

In some embodiments, contraband module 204 also determines whether power should be relayed through smart power adapter 200 based on detecting the user of device 110 and confirming that the detected user is approved for utilizing device 110 and/or any device within the controlled environment (e.g., the controlled environment may include blacklists of inmates that are not allowed to utilize devices). Contraband module 204 communicates with device 110 to query the user for the user's identification information, such as biometric data including the user's facial data, fingerprint data, and/or voice data. For example, contraband module 204 causes a camera on device 110 to activate and automatically captures an image of the current user of device 110. Contraband module 204 then forwards this image data to smart outlet 120 or monitoring center 130 for determining whether the detected user is authorized to use device 110 and/or authorized to user any wireless device. In some embodiments, contraband module 204 will receive a message indicating that the user is authorized or not authorized and based on this message, contraband module 204 will either allow or prevent power from being relayed to device 110.

Processor circuitry 206 includes one or more processors. Processors control the operation of smart power adapter 200 and its components. In some embodiments, memory 208 can be any well-known volatile and/or non-volatile memory that is removable and/or non-removable. Memory 208 can store a list of authorized identifiers associated with devices that have been approved for usage within the controlled environment. In some embodiments, smart power adapter 200 receives the lists of authorized devices (and updates) from smart outlet 120 and/or monitoring center 130 such as through communication module 210. In some embodiments, memory 208 also stores a unique identifier that identifies smart power adapter 200 within the controlled environment. In some embodiments, each smart power adapter 200 within the controlled environment stores a unique identifier that allows monitoring center 130 to identify and/or locate smart power adapters within the controlled environment. For example, monitoring center 130 can utilize the unique identifiers for each smart power adapter 200 to determine to which smart outlet 120 the adapters are connected. In some embodiments, memory 208 also stores a history of devices that have been connected to smart power adapter 200. The history of devices includes any of device identification information of the devices, a period of time that each device was connected to smart power adapter 200, and outlet identification information of any outlets to which smart power adapter 200 has been connected.

In some embodiments, communication module 210 includes one or more transceivers, transmitters, and/or receivers that manage and communicate data to device 110, smart outlet 120, and/or monitoring center 130. In some embodiments, communication module 210 transmits data such as queries from smart outlet 120 and/or monitoring center 130 to device 110. If smart outlet 120 communicates over an electrical connection with monitoring center 130, then the data is in the form of electrical signals that are superimposed on the power wave that is traditionally transmitted over the electrical connection. For example, data that is intended to be received by device 110 can be transmitted at a different frequency than electrical waves to ensure that the data signal does not interfere with the power wave. In some embodiments, communication module 210 translates data signals received from smart outlet 120 and monitoring center 130 into appropriate signals that can be understood and processed by device 110. In some embodiments, such signals are addressed to the specialized software that is installed on device 110.

In some embodiments, communication module 210 also includes a wireless interface, such as Wi-Fi interface, cellular interface, and Bluetooth interface. Wi-Fi interface includes a Wi-Fi transceiver that enables Wi-Fi communication between smart power adapter 200 and an external device that also has Wi-Fi capability such as devices in controlled environment. Cellular interface which includes a cellular transceiver that enables cellular communication between smart power adapter 200 and an external device that has cellular capability such as cellular antenna. Bluetooth interface includes a Bluetooth transceiver that enables Bluetooth communication between smart power adapter 200 and an external device that also has Bluetooth capability.

Communication module 210 also communicates with associated monitoring centers of controlled environments, such as monitoring center 130. Communication module 210 allows monitoring center 130 to manage and otherwise control operations of smart power adapter 200 either through the powerline network associated with a smart outlet or through wireless communications. For example, communication module 210 responds to queries from monitoring center 130 with a unique identifier (e.g., retrieved from memory 208) and transmits responses to monitoring center 130. As another example, communication module 210 communicates status information regarding operations (e.g., stored in memory 208) of smart power adapter 200 to monitoring center 130.

Exemplary Smart Outlet

Figure 3:
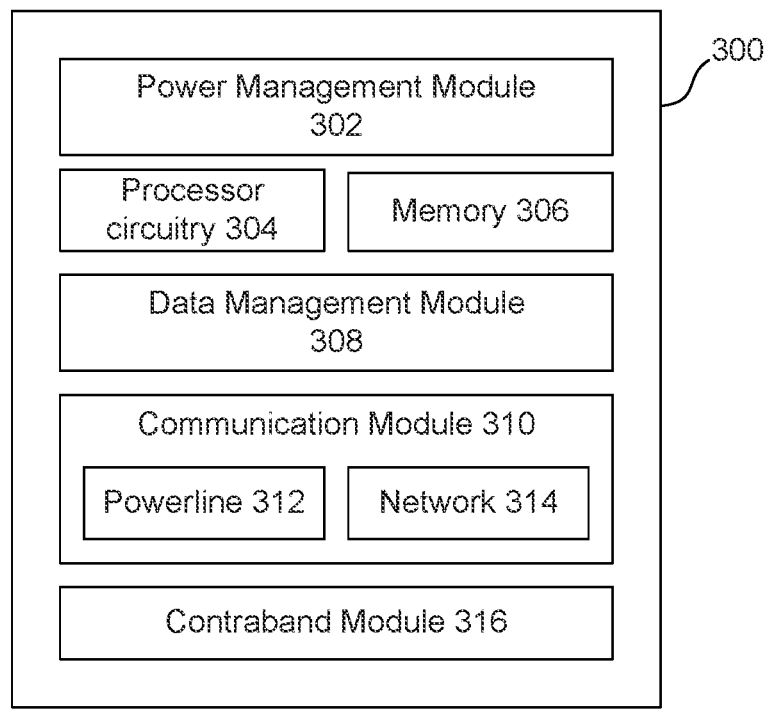
FIG. 3 illustrates a block diagram of an exemplary smart power outlet for use in the exemplary contraband detection system of FIG. 1, according to embodiments of the present disclosure.

FIG. 3 illustrates a block diagram of an exemplary smart outlet 300 for use in the exemplary contraband detection system of FIG. 1, according to embodiments of the present disclosure. In some embodiments, smart outlet 300 represents an exemplary embodiment of smart outlet 120 as described in FIG. 1. Smart outlet 300 controls power to external devices and transmits data to and from external devices, to and from monitoring centers associated with a controlled environment in which smart outlet 300 is installed, and between external devices and monitoring centers. In some embodiments, smart outlet 300 includes power management module 302, processor circuitry 304, memory 306, data management module 308, communication module 310 that includes powerline module 312 and network module 314, and contraband module 316.

In some embodiments, power management module 302 is a component that manages the relay of power through smart outlet 300 to a connected external device such as device 110. In some embodiments, device 110 is connected to smart outlet 300 through a power adapter, such as smart power adapter 200. In some embodiments, power management module 302 receives commands from processor circuitry 304, communication module 310, and contraband module 316 to allow for or prevent power to be relayed through smart outlet 300.

Processor circuitry 304 includes one or more processors. Processors control the operation of smart outlet 300 and its components. In some embodiments, memory 306 can be any well-known volatile and/or non-volatile memory that is removable and/or non-removable. Memory 306 can store a list of authorized identifiers associated with devices that have been approved for usage within the controlled environment and identification information associated with all residents of the controlled environment in which smart outlet 300 is installed. In some embodiments, smart outlet 300 receives lists of authorized devices (and updates) from monitoring center 130 such as through communication module 310. In some embodiments, each smart outlet 300 within the controlled environment stores a unique identifier that allows monitoring center 130 to identify and/or locate smart outlets within the controlled environment. For example, monitoring center 130 can utilize the unique identifiers for each smart power adapter 200 to determine to which smart outlet 300 the adapters are connected. In some embodiments, memory 306 also stores rules associated with the relaying of power through smart outlet 300. For example, rules can include but are not limited to controlling hours in which power may be relayed through smart outlet, default state of smart outlet 300, and a maximum duration of a session in which power can be relayed to a connected external device. The default state of smart outlet 300 refers to whether smart outlet is inactive (e.g., does not relay power by default) or active (e.g., a regular outlet that relays power by default). Rules are either pushed to memory 306 or pulled, such as through a request from data management module 308. In some embodiments, memory 306 also stores profile information of devices and/or inmates of the controlled environment in which smart outlet 300 is installed. Profile information includes information as to whether an inmate is approved for utilizing certain external devices, which devices are approved for receiving power through smart outlets in the controlled environment, and which smart outlets are approved for provisioning power to an inmate or device (e.g., a device or an inmate can be approved to connect to only certain smart outlets such as in their cells or in common areas).

In some embodiments, data management module 308 manages data that is transmitted through smart outlet 300, such as between smart power adapter 200 and monitoring center 130. Functions of data management include receiving data that is transmitted by devices connected to smart outlet 300 such as device 110, smart power adapter 200, and monitoring center 130. Examples of data include device identification data, user identification data, smart power adapter identification data, smart outlet identification data, history information regarding external devices (e.g., devices, smart power adapters) that were previously connected to smart outlet 300, and status information regarding the external devices (e.g., how long each external device was connected to smart outlet 300). In some embodiments, data management module 308 also manages any rules and profiles associated with external devices, such as device 110 and/or smart power adapter 200, and registered users of contraband detection system 100, such as residents of controlled environment. For example, data management module 308 manages updates and/or modifications to these rules and profiles that are either pushed or pulled to smart outlet 300.

In some embodiments, communication module 310 includes one or more transceivers, transmitters, and/or receivers that communicate data transmitted and received by smart outlet 300. For example, communication module 310 includes powerline module 312 for communicating and receiving data over electrical connections and network module 314. Data is transmitted to and/or received from any of external devices, such as device 110, smart power adapter 200, and/or monitoring center 130. In some embodiments, communication module 310 receives data such as profiles and rules from monitoring center 130. Other examples include receiving queries from monitoring center 130 and transmitting queries to device 110. As previously described, in some embodiments, smart outlet 300 communicates over an electrical connection with monitoring center 130 and data is transmitted in the form of electrical signals that are superimposed on the power wave that is traditionally transmitted over the electrical connection. Such a transmission is accomplished through powerline module 312.

In some embodiments, communication module 310 also includes network module 314 such as a Wi-Fi interface, cellular interface, and Bluetooth interface. Wi-Fi interface includes a Wi-Fi transceiver that enables Wi-Fi communication between smart outlet 300 and an external device that also has Wi-Fi capability such as devices in controlled environment. Cellular interface which includes a cellular transceiver that enables cellular communication between smart outlet 300 and an external device that has cellular capability such as cellular antenna. Bluetooth interface includes a Bluetooth transceiver that enables Bluetooth communication between smart outlet 300 and an external device that also has Bluetooth capability.

Communication module 310 also communicates with associated monitoring centers of controlled environments, such as monitoring center 130. Communication module 310 allows monitoring center 130 to manage and otherwise control operations of smart outlet 300 either through the powerline network associated with a smart outlet (e.g., through powerline module 312) or through wireless communications (e.g., network module 314). For example, communication module 310 responds to queries from monitoring center 130 with a unique identifier of smart outlet 300 (e.g., retrieved from memory 306) and transmits responses to monitoring center 130. As another example, communication module 310 communicates status information regarding operations (e.g., stored in memory 306) of smart power adapter 200 to monitoring center 130.

In some embodiments, contraband module 316 is a component that performs contraband detection for any device, such as device 110 that connects to smart outlet 300 through a power adapter such as smart power adapter 200. However, connections between device 110 and smart outlet 300 do not need to be through a smart power adapter 200 if smart outlet 300 or monitoring center 400 (discussed further below) includes capabilities for detecting contraband devices. In other words, contraband detection within contraband detection system 100 is not dependent on all components including contraband detection capability. As long as at least one component (e.g., smart power adapter 200, smart outlet 300, and monitoring center 130) includes capabilities for detecting contraband devices (e.g., by performing device identification authentication), contraband detection system 100 will be capable of detecting contraband devices within a controlled environment.

In some embodiments, when device 110 is connected to an adapter, such as by connecting power cable 112 to device 110, contraband module 316 receives identification information associated with the device 110 through power cable 112 and the adapter. As noted above, in some embodiments, adapter is implemented as a conventional adapter and in some embodiments, adapter is implemented as a smart power adapter, such as smart power adapter 200. In embodiments where adapter is a smart adapter, contraband module 316 receives identification of the smart adapter. In some embodiments, the identification information (of device 110, of smart power adapter 200 or both) is transmitted automatically to contraband module 316. In some embodiments, device identification information is transmitted by a software application in device 110 (e.g., upon connecting device 110 and power cable 112). In some embodiments, the identification is transmitted by the software application in device 110 in response to a query from contraband module 204. In some embodiments, adapter identification information is transmitted by communication module 210 of smart power adapter 200.

In some embodiments, contraband module 316 determines whether device 110 is authorized to receive power through any outlet based on the received identification information. In some embodiments, this determination is performed by contraband module 316. In some embodiments, smart outlet 300 does not perform contraband detection (e.g., contraband module 316 is absent or not working) and forwards the identification information to another smart power component for contraband detection such as a monitoring center, such as monitoring center 130, associated with the controlled environment. In some embodiments, smart power adapter 200 performs the contraband detection and transmits a signal to contraband module 316 indicating whether the device connected to smart power adapter 200 is authorized to receive power. In response to this signal, contraband module 316 changes its power state to active or inactive based on whether the device is authorized to receive power.

In some embodiments, contraband module 316 also determines whether power should be relayed through smart outlet 300 based on detecting the user of device 110 and confirming that the detected user is approved for utilizing device 110 and/or any device within the controlled environment (e.g., the controlled environment may include blacklists of inmates that are not allowed to utilize devices). Contraband module 316 communicates with device 110 to query the user for the user's identification information, such as biometric data including the user's facial data, fingerprint data, and/or voice data. For example, contraband module 316 causes a camera on device 110 to activate and automatically captures an image of the current user of device 110. Contraband module 316 then processes the image data and compares it with inmate data stored in smart outlet 300 and/or forwards this image data to monitoring center 130 for determining whether the detected user is authorized to use device 110 and/or authorized to user any wireless device. In embodiments when the user data is transmitted to monitoring center 130, contraband module 316 will receive a message from monitoring center 130 indicating that the user is authorized or not authorized and based on this message, contraband module 316 will either allow or prevent power from being relayed to device 110.

Exemplary Monitoring Center

Figure 4:
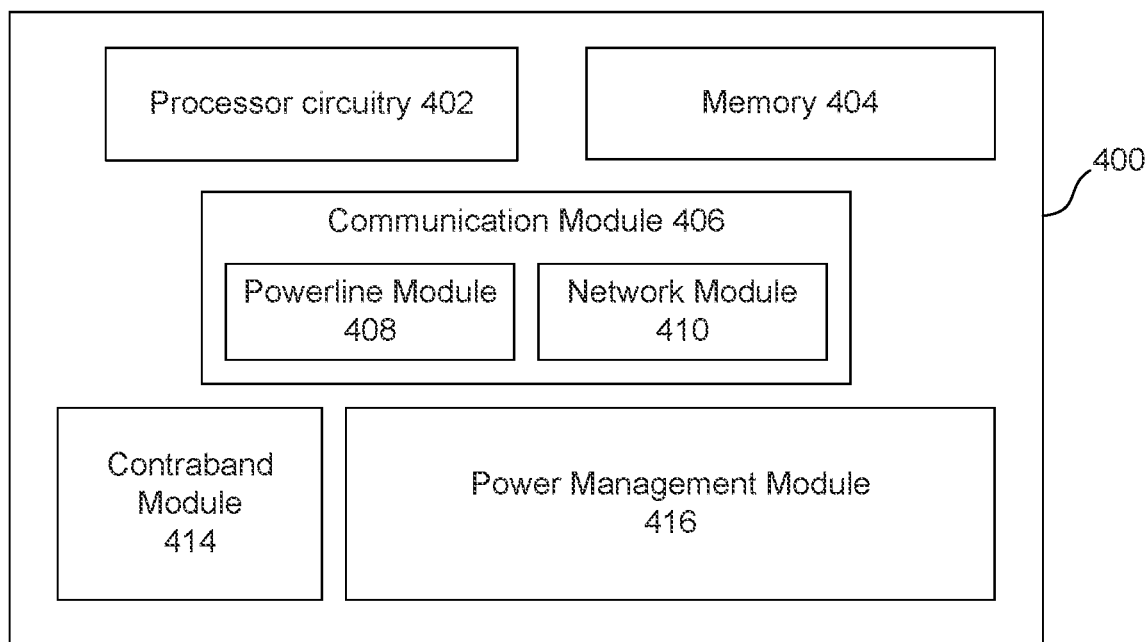
FIG. 4 illustrates a block diagram of an exemplary monitoring center for use in the exemplary contraband detection system of FIG. 1, according to embodiments of the present disclosure.

FIG. 4 illustrates a block diagram of an exemplary monitoring center 400 for use in the exemplary contraband detection system of FIG. 1, according to embodiments of the present disclosure. In some embodiments, monitoring center 400 represents an exemplary embodiment of monitoring center 130 as described in FIG. 1. In some embodiments, monitoring center 400 is implemented as a single device, multiple devices or a cloud-based device. Monitoring center 400 is associated with the controlled environment and monitors status and operations of power delivery through smart outlets and smart adapters in the controlled environment. In some embodiments, monitoring center 400 includes processor circuitry, memory 404, communication module 406 that includes powerline module 408 and network module 410, device profiles 412, contraband module 414, and power management module 416.

Processor circuitry 402 includes one or more processors. Processors control the operation of monitoring center 400 and its components. In some embodiments, memory 404 can be any well-known volatile and/or non-volatile memory that is removable and/or non-removable. Memory 404 can store information needed to control and manage operations of contraband detection system 100. Information includes but is not listed to a list of authorized identifiers associated with devices that have been approved for usage within the controlled environment, identification information associated with all residents of the controlled environment, profiles of residents of the controlled environment, profiles of devices of the controlled environment, rules associated with devices, rules associated with smart outlets, rules associated with residents, and rules associated with smart power outlets. Rules relate to conditions in which power is to be provided or denied to by smart outlets and/or adapters to specific devices and/or residents within the controlled environment. Profiles include information regarding each of the smart outlets, smart power adapters, specific devices, and/or residents within the controlled environment that provide information utilized by the rules to determine whether power should be provided or denied.

Examples of information stored in smart outlet profiles include, but are not limited to, identification information that uniquely identifies the smart outlet within the controlled environment, information as to the smart outlet's location within the controlled environment, and history information as to which devices and/or residents have been previously connected to the smart outlet. Examples of rules associated with smart outlets include, but are not limited to, power provisioning based on smart power adapter identifiers, device identifiers, user identifiers, and/or time restrictions.

Examples of information stored in smart power adapter profiles include, but are not limited to, identification information that uniquely identifies the smart power adapter within the controlled environment and history information as to which smart outlets, which devices, and which residents have been associated with the smart power adapter. Examples of rules associated with smart power adapters include but are not limited to, power provisioning based on smart outlet identifiers, device identifiers, user identifiers, and/or time restrictions.

In some embodiments, communication module 406 includes one or more transceivers, transmitters, and/or receivers that communicate data transmitted and received by monitoring center 400. For example, communication module 406 includes powerline module 408 for communicating and receiving data over electrical connections and network module 410. Data is transmitted to and/or received from any of external devices, such as device 110, smart power adapter 200, and/or smart outlet 300. In some embodiments, communication module 406 transmits data such as profiles and rules to smart power adapter 200 and/or smart outlet 300.

Examples of such transmissions include but are not limited to transmitting lists of authorized devices (and updates) to smart power adapter 200 and/or smart outlet 300, rules for any of devices, such as device 110, residents, smart adapters, such as smart power adapter 200, and smart outlets, such as smart outlet 300. In some embodiments, monitoring center 130 identifies and/or locates smart outlets or power adapters within the controlled environment based a unique identifier associated with each smart outlet and power adapter. For example, monitoring center 130 utilizes the unique identifiers for each smart power adapter 200 and/or smart outlet 300 to determine to which smart outlet 300 the smart power adapter is connected.

In some embodiments, communication module 406 also includes network module 410 such as a Wi-Fi interface, cellular interface, and Bluetooth interface. Wi-Fi interface includes a Wi-Fi transceiver that enables Wi-Fi communication between monitoring center 400 and an external device that also has Wi-Fi capability such as devices in controlled environment. Cellular interface which includes a cellular transceiver that enables cellular communication between monitoring center 400 and an external device that has cellular capability such as cellular antenna. Bluetooth interface includes a Bluetooth transceiver that enables Bluetooth communication between monitoring center and an external device that also has Bluetooth capability.

In some embodiments, contraband module 414 is a component that performs contraband detection for any device, such as device 110 that connects to smart outlet 300 through a power adapter such as smart power adapter 200. In some embodiments, contraband module 414 will perform contraband detection of devices when smart power adapter 200 and/or smart outlet 300 are not capable of performing the contraband detection. In such embodiments, necessary information to perform contraband detection, such as device identification information and additional information such as identification information associated with smart power adapter 200 and/or smart outlet 300 are transmitted to monitoring center 400. As noted above, only one component within contraband detection system 100 needs to include contraband detection capability within their respective contraband module. Accordingly, as long as at least one component (e.g., smart power adapter 200, smart outlet 300, and monitoring center 130) includes capabilities for detecting contraband devices (e.g., by performing device identification authentication), contraband detection system 100 will be capable of detecting contraband devices within a controlled environment.

In some embodiments, when device 110 is connected to an adapter, such as by connecting power cable 112 to device 110 and an outlet, such as smart outlet 300, contraband module 414 receives identification information associated with the device 110 through power cable 112 and the adapter. Other types of identification information include but are not limited to smart outlet and smart power adapter identification information. In some embodiments, the adapter is implemented as a conventional adapter and the outlet is implemented as a conventional outlet. In some embodiments, the adapter is implemented as a smart power adapter, such as smart power adapter 200, and the outlet is implemented as a smart outlet, such as smart outlet 300. In embodiments where adapter is a smart power adapter and/or outlet is a smart outlet, contraband module 414 receives identification of the smart power adapter 200 and/or smart outlet 300. In some embodiments, the identification information (of device 110, of smart power adapter 200 or both) is transmitted automatically to contraband module 414. In some embodiments, device identification information is transmitted by a software application in device 110 (e.g., upon connecting device 110 and power cable 112). In some embodiments, the identification is transmitted by the software application in device 110 in response to a query from contraband module 204. Adapter identification information is transmitted by communication module 210 of smart power adapter 200 and outlet identification information is transmitted by communication module 310 of smart outlet 300.

In some embodiments, contraband module 414 determines whether device 110 is authorized to receive power based on the received identification information. This determination is based on at least one the device identification information, smart power identification information, smart outlet identification information and retrieving the appropriate rules and profiles associated with the received identification information that indicate whether device 110 is authorized to receive power. For example, contraband module 414 determines, based on an associated rule(s) and profile(s) that device 110 is authorized to receive power from an outlet in the cell of the inmate but no other outlets. Accordingly, contraband module 414 determines whether device 110 is connected to the appropriate outlet, and if so, transmits a signal that device 110 is approved to receive power. In response to this determination, contraband module 414 transmits a signal to the outlet to which device 110 is connected. In some embodiments, the signal causes the outlet to change its power state to active or inactive based on whether the device is authorized to receive power.

In some embodiments, contraband module 414 also determines whether power should be relayed through smart outlet 300 based on detecting the user of device 110 and confirming that the detected user is approved for utilizing device 110 and/or any device within the controlled environment (e.g., the controlled environment may include blacklists of inmates that are not allowed to utilize devices). Contraband module 414 communicates with device 110, smart outlet 300, and/or smart power adapter 200 to query the user for the user's identification information, such as biometric data including the user's facial data, fingerprint data, and/or voice data.

In some embodiments, power management module 416 is a component that allows monitoring center 400 to control the provisioning of power by any smart outlet to which monitoring center 400 has an electrical or network connection. In some embodiments, power management module 416 transmits commands to smart outlets and smart power adapters such as commands to activate or deactivate them.

Exemplary Smart Power Connection Operation

Figure 5:
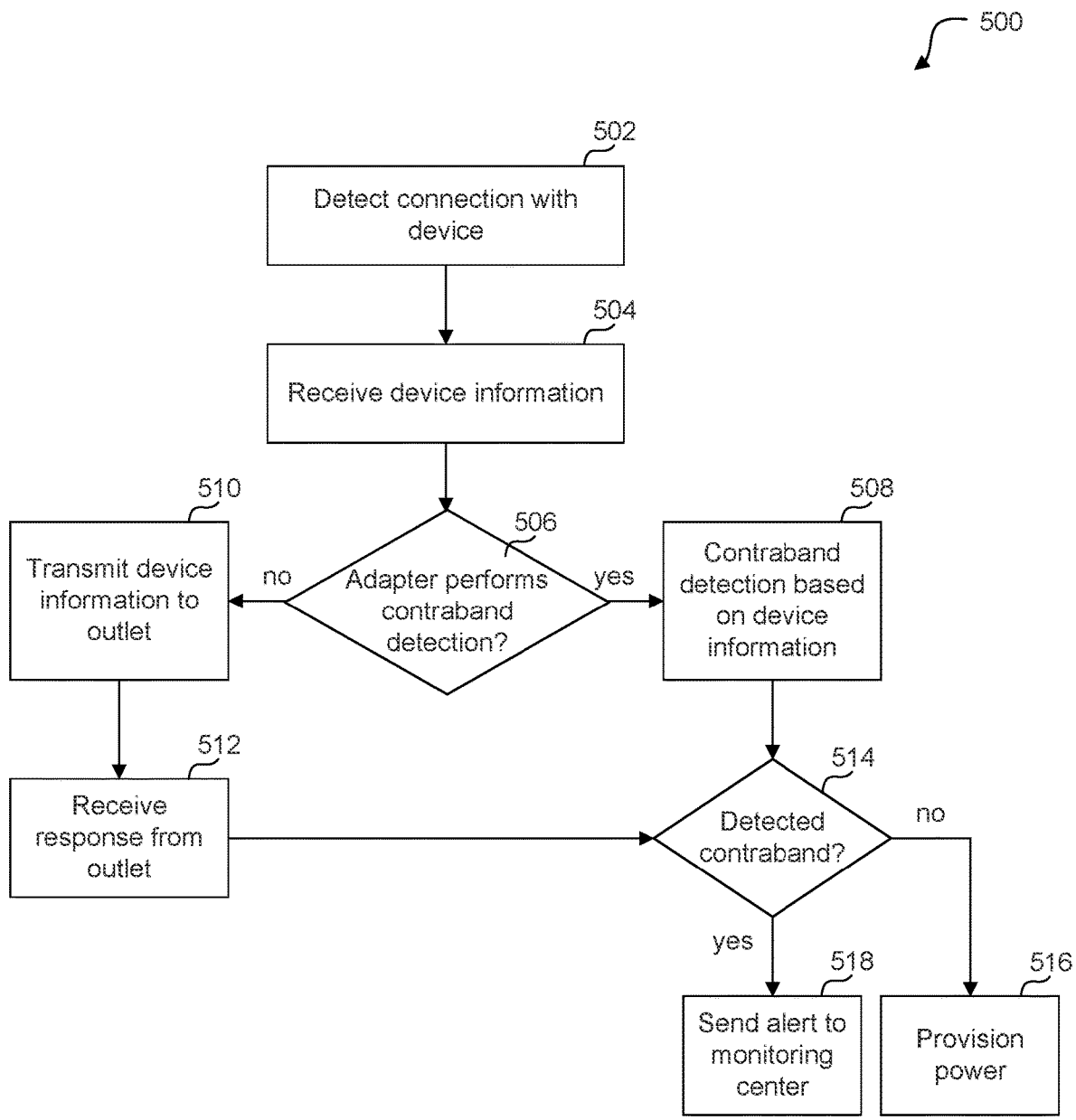
FIG. 5 illustrates a flowchart diagram of an exemplary method for contraband detection by a smart power adapter in the exemplary contraband detection system of FIG. 1, according to embodiments of the present disclosure.
Figure 6:
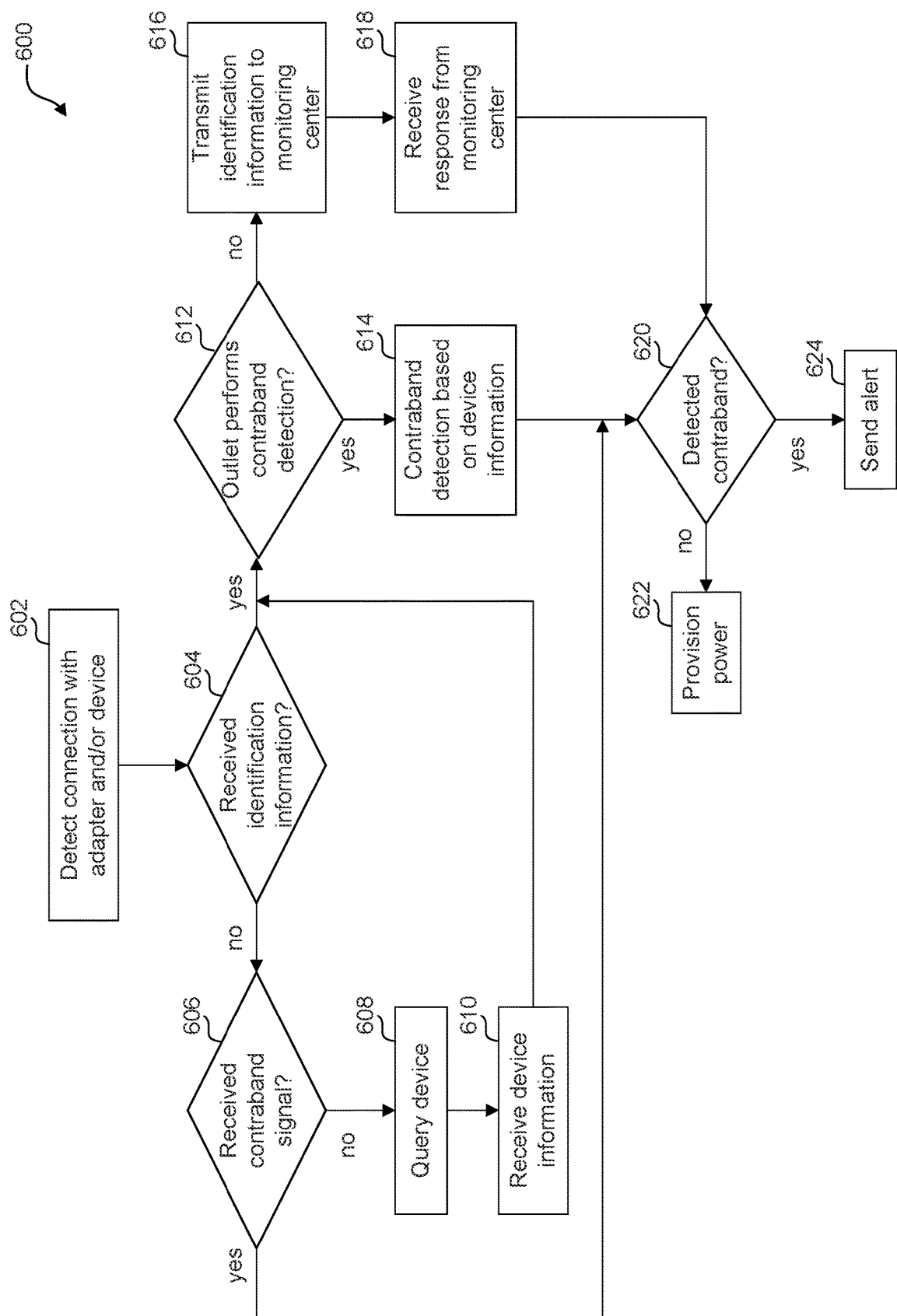
FIG. 6 illustrates a flowchart diagram of an exemplary method for contraband detection by a smart outlet in the exemplary contraband detection system of FIG. 1, according to embodiments of the present disclosure.
Figure 7:
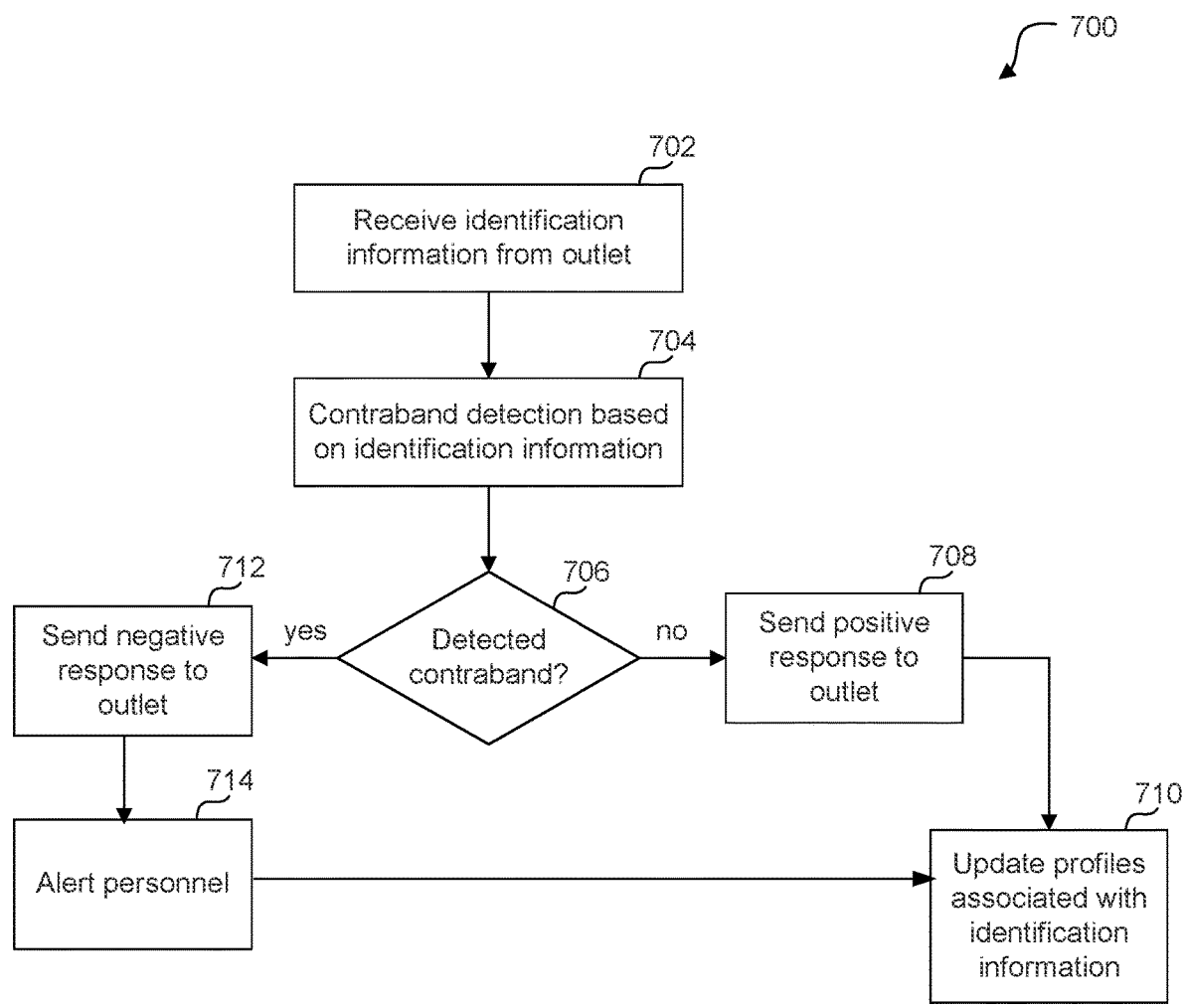
FIG. 7 illustrates a flowchart diagram of an exemplary method for contraband detection by a monitoring center in the exemplary contraband detection system of FIG. 1, according to embodiments of the present disclosure.

Exemplary usage of contraband detection system 100 will be described with respect to FIGS. 5-7. The exemplary usage described in FIGS. 5-7 can be performed by processing logic that can comprise hardware (e.g., circuitry, dedicated logic, programmable logic, microcode, etc.), software (e.g., instructions executing on a processing device), or a combination thereof. For illustrative purposes, FIGS. 5-7 are described with respect to FIGS. 1-4 but are not limited to these example embodiments. The methods described in FIGS. 5-7 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIGS. 5-7, as will be understood by a person of ordinary skill in the art. Additionally, some steps can be combined with steps of methods from other figures and performed as a single step.

FIG. 5 illustrates a flowchart diagram of an exemplary method 500 for performing contraband detection by a smart power adapter in an exemplary contraband detection system 100 of FIG. 1, according to some embodiments of the present disclosure. In some embodiments, method 500 can be performed by smart power adapter 200.

In 502, smart power adapter 200 detects that a connection has been established with a device, such as device 110. In some embodiments, this connection is through a power cable, such as power cable 112. In some embodiments, this detection is performed automatically upon connecting power cable 112 to device 110 (e.g., through a USB connection between power cable 112 and device 110). In some embodiments, this detecting is performed in response to a query that is transmitted by contraband module 204 of smart power adapter 200.

In 504, smart power adapter 200 receives device information, such as identification information that uniquely identifies device 110, from device 110. In some embodiments, the device information is provided by customized software installed on device 110 by controlled environment and includes a device identifier associated with device 110. In some embodiments, the device information also includes profile information that is stored on a secure area of device 110 and this profile information includes but is not limited profiles associated with the user of device 110 and or a device profile associated with device 110.

In 506, smart power adapter 200 determines whether it is capable of performing contraband detection of device 110. In some embodiments, determination of capability is based on whether smart power adapter 200 includes contraband module 204 and/or if contraband module 204 is operating properly. If smart power adapter 200 is capable of determining whether device 110 is contraband based on the received device information, in 508, contraband module 204 performs contraband detection as described in some embodiments above. For example, contraband detection includes determining, based on the received device information, whether device 110 is authorized by controlled environment to receive power while within the controlled environment. In some embodiments, this determination is based on comparing the device identifier with a list of identifiers authorized by the controlled environment for receiving power.

In 510, if smart power adapter 200 is not capable of performing contraband detection, then smart power adapter 200 transmits the device information to the connected outlet, which may or may not be implemented as a smart outlet. In 512, smart power adapter 200 receives a response from the outlet which indicates whether device 110 is contraband. In 514, smart power adapter 200 determines whether device 110 is contraband based on the performed contraband detection.

In 516, if device 110 is not determined to be a contraband device, then smart power adapter 200 begins provisioning power to device 110. In some embodiments, provisioning power includes activating smart power adapter 200 and/or the outlet from an inactive state to an active state. In some embodiments, the default state of smart power components (e.g., smart power adapter 200, smart outlet 300) within contraband detection system 100 is inactive which means that they are not capable of relaying power to connected devices. When activated, smart power components become capable of relaying power to device 110. In 518, if device 110 is determined to be a contraband device, then smart power adapter 200 does not provision power (e.g., remains in an inactive state) and sends an alert to monitoring center. In some embodiments, the alert indicates the attempted request for power, reason(s) why the request was denied, and any information with respect to device 110, smart power adapter 200, and the outlet to which these components attempted to receive power.

FIG. 6 illustrates a flowchart diagram of an exemplary method 600 for performing contraband detection by a smart outlet within an exemplary contraband detection system 100 of FIG. 1, according to embodiments of the present disclosure. In some embodiments, method 600 can be performed by smart outlet 300.

In 602, smart outlet 300 detects that a connection has been established between smart outlet 300 and an external device including at least one of device 110 and a power adapter such as smart power adapter 200. In some embodiments, the power adapter is a conventional adapter and smart outlet 300 only detects connection with device 110 because a conventional adapter does not necessarily include, for example, memory for storing identification information regarding the adapter. In some embodiments, this detection (either from device 110, the power adapter, or both) is performed automatically upon connecting the power adapter (e.g., through a USB connection between power cable 112 and device 110) to smart outlet 300. In some embodiments, connecting only the power adapter (e.g., without a device 110 connected to the power adapter) does not result in a request for power since there are no devices that require power connected to the power adapter. In other words, a request for power is transmitted upon the connection of device 110, a power adapter (either smart power adapter 200 or a conventional power adapter) to smart outlet 300. In some embodiments, this detecting is performed in response to a query that is transmitted by contraband module 316 of smart outlet 300.

In 604, smart outlet 300 determines whether it has received identification information, such as device identification information that uniquely identifies device 110, from device 110 and/or adapter identification information that uniquely identifies the power adapter (if the power adapter is implemented as smart power adapter 200 that includes stored identification information). In some embodiments, the device identification information is provided by customized software installed on device 110 by controlled environment and includes a device identifier associated with device 110. In some embodiments, the device identification information also includes profile information that is stored on a secure area of device 110 and this profile information includes but is not limited profiles associated with the user of device 110 and or a device profile associated with device 110.

In 606, if no identification information is received (e.g., power adapter has not transmitted any device identification information or adapter identification information), smart outlet 300 next determines whether it has received a contraband signal from the power adapter. In some embodiments, the power adapter transmits a contraband signal to smart outlet 300 if the power adapter is capable of performing contraband detection. The contraband signal indicates the results of the power adapter's contraband detection such as whether device 110 is permitted or restricted from receiving power from smart outlet 300.

If smart outlet 300 does not receive identification information or the contraband signal, in 608, then smart outlet 300 queries device 110 for device identification information.

In some embodiments, the query is transmitted to customized software installed on device 110 by the controlled environment. In some embodiments, the query is tailored such that it can only be responded to be the customized software. In some embodiments, the controlled environment will install the customized software on devices that have been approved for use and for receiving power within controlled environment. In other words, in some embodiments, contraband devices generally will not have customized software installed on them and therefore will not be able to respond to queries from smart outlet 300. In some embodiments, the query is transmitted to existing software on device 110 and requests unique identification information that has been pre-stored on device 110 (e.g., a MAC address).

In 610, smart outlet 300 receives device identification from device 110 in response to the query.

In 612, smart outlet 300 determines whether it is capable of performing contraband detection of device 110. In some embodiments, determination of capability is based on whether smart outlet 300 includes contraband module 316 and/or if contraband module 316 is operating properly. If smart outlet 300 is capable of determining whether device 110 is contraband based on the received device information, in 614, contraband module 316 performs contraband detection as described in some embodiments above. For example, contraband detection includes determining, based on the received device information, whether device 110 is authorized by the controlled environment to receive power while within the controlled environment. In some embodiments, this determination is based on comparing the device identifier with a list of identifiers authorized by the controlled environment for receiving power. Other examples of contraband detection include but are not limited determining whether device 110 is authorized to receive power from only specific outlets within the controlled environment, whether device 110 is authorized to be used by a specific resident of the controlled environment, and/or whether device 110 is authorized to receive power during specific periods of the day.

In 616, if smart outlet 300 is not capable of performing contraband detection, then smart outlet 300 transmits the identification information to the connected monitoring center, such as monitoring center 400. As noted above, smart outlet 300 is connected to monitoring center 400 through the electrical connections of the controlled environment and/or through network connections. Accordingly, transmission of the identification information is through a powerline communication through the electrical connections of the controlled environment and/or transmitted through a network connection, such as a Wi-Fi connection. In 618, smart outlet 300 receives a response from the monitoring center 400, the respond indicating whether device 110 is contraband.

In 620, smart outlet 300 determines whether device 110 is contraband based on the performed contraband detection. In 622, if device 110 is not determined to be a contraband device, then smart outlet 300 begins provisioning power to device 110. In some embodiments, provisioning power includes activating smart outlet 300 from an inactive state to an active state and/or activing smart power adapter 200 from an inactive state to an active state. As previously noted, in some embodiments, the default state of smart power components (e.g., smart power adapter 200, smart outlet 300) within contraband detection system 100 is inactive which means that they are not capable of relaying power to connected devices. In 624, if device 110 is determined to be a contraband device, then smart outlet 300 does not provision power (e.g., remains in an inactive state) and sends an alert to monitoring center. In some embodiments, the alert indicates the attempted request for power, reason(s) why the request was denied, and any information with respect to device 110, smart power adapter 200, and smart outlet 300.

FIG. 7 illustrates a flowchart diagram of an exemplary method 700 for performing contraband detection by a monitoring center within an exemplary contraband detection system 100 of FIG. 1, according to embodiments of the present disclosure. In some embodiments, method 700 can be performed by monitoring center 400.

In 702, monitoring center 400 receives identification information associated with device 110 from an outlet, which may be implemented as a smart outlet 300 or as a conventional outlet. As noted above, in some embodiments, monitoring center 400 is connected to outlets in the controlled environment through the controlled environment's electrical system and/or through a network connection. Accordingly, the identification information is received as a powerline communication through the electrical system and/or through a network connection such as a Wi-Fi connection. In some embodiments, monitoring center 400 receives identification information from the outlet when the outlet and the power adapter that are connected to device 110 are not capable of performing contraband detection.

In 704, monitoring center 400 performs contraband detection as described in some embodiments above. For example, contraband detection includes determining, based on the received device information, whether device 110 is authorized by the controlled environment to receive power while within the controlled environment. In some embodiments, this determination is based on comparing the device identifier with a list of identifiers authorized by the controlled environment for receiving power.

In 706, monitoring center 400 determines whether device 110 is a contraband device based on the performed contraband detection. In 708, if device 110 is not determined to be a contraband device, then monitoring center 400 transmits a positive response to the connected outlet, power adapter, and/or device 110 where the positive response indicates that device 110 is approved to receive power. For example, if connected outlet is a smart outlet, such as smart outlet 300, then the response indicates to the outlet to be transition to or remain in an active state in order to relay power to device 110. If connected outlet is a conventional outlet but the power adapter is a smart power adapter, such as smart power adapter 200, then the response indicates to the power adapter to transition to or remain in an active state in order to relay power to device 110.

In 710, monitoring center 400 updates the profiles associated with device 110, smart power adapter 200, and/or smart outlet 300 to include the status of the current request as well as any additional information associated with the contraband detection.

In 712, if monitoring center 400 determines that device 110 is a contraband device, then monitoring center 400 transmits a negative response to the connected outlet, power adapter, and/or device 110 where the negative response indicates that device 110 is not approved to receive power. For example, if connected outlet is a smart outlet, such as smart outlet 300, then the response indicates to the outlet to transition or remain in an inactive state in order to prevent power from being provisioned to device 110. If connected outlet is a conventional outlet but the power adapter is a smart power adapter, such as smart power adapter 200, then the response indicates to the power adapter to remain or transition to an active state.

In 714, monitoring center 400 sends an alert to the appropriate personnel of controlled environment with information regarding the failed attempt to receive power from an outlet within the controlled environment.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 8:
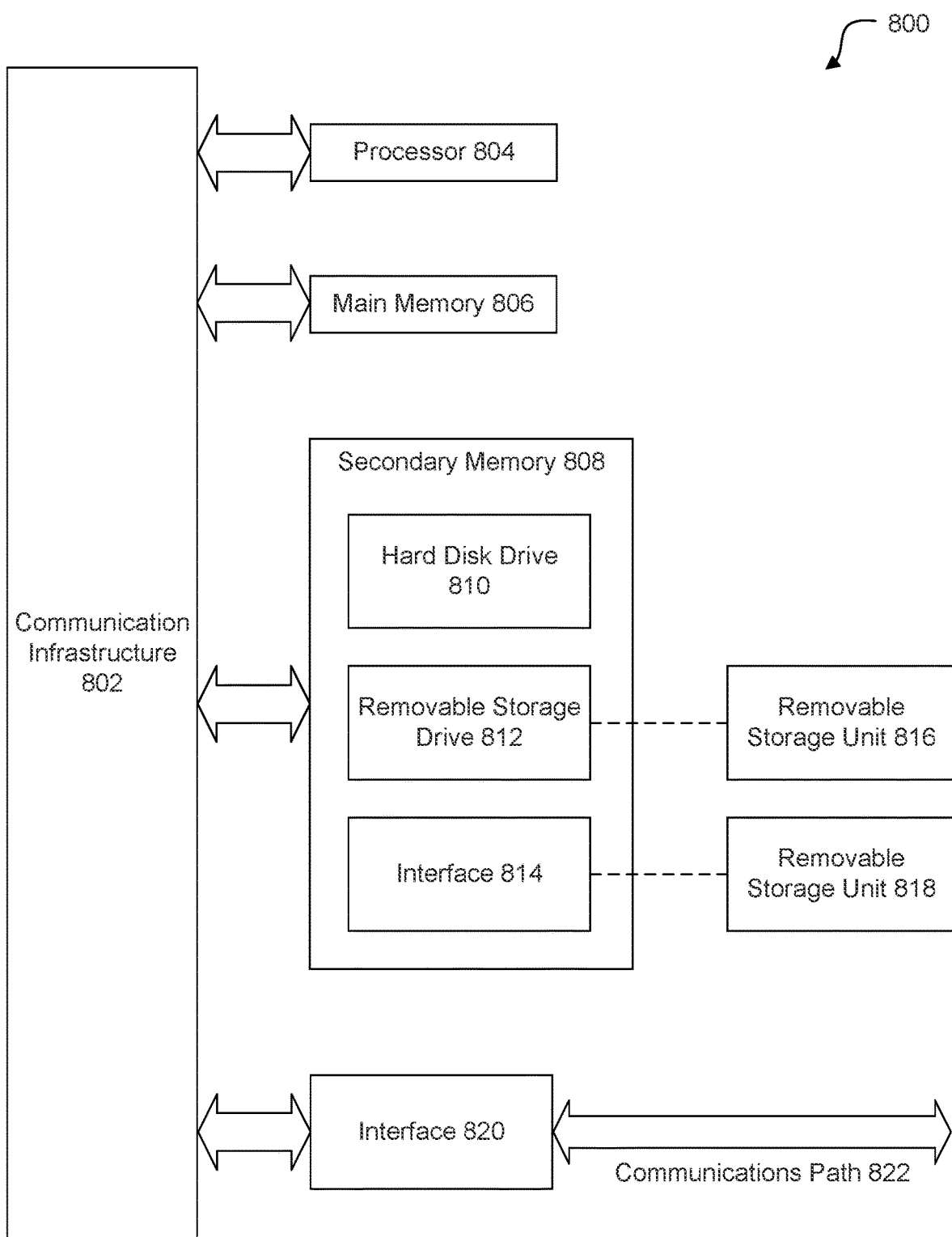
FIG. 8 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 5-7 can be implemented in the environment of one or more computer systems or other processing systems. An example of such a computer system 800 is shown in FIG. 8. One or more of the modules depicted in the previous figures can be at least partially implemented on one or more distinct computer systems 800.

Computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the disclosure using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCM-CIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800 to implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A method for contraband detection in a controlled environment, comprising:

detecting, by a smart outlet, a connection between a connector of the smart outlet and a connection mechanism of a power cable, wherein the power cable is configured to be connected to a device via a Universal Serial Bus (USB) connection;

receiving, by the smart outlet, identification information associated with the device;

receiving, by the smart outlet and pushed from a monitoring center associated with the controlled environment, one or more rules for relaying power through the smart outlet, wherein at least one of the one or more rules indicates one or more authorized locations in the controlled environment in which the device is authorized to receive the power;

retrieving, based on the identification information associated with the device, the at least one of the one or more rules associated with the device;

determining, by the smart outlet, whether the device is authorized to receive the power via the connection mechanism based on determining the one or more authorized locations in the controlled environment indicated by the at least one of the one or more rules matching location information of the smart outlet;

activating the smart outlet from an inactive state to an active state in response to the device being authorized; and relaying, after the smart outlet is activated to the active state, the power from the smart outlet through the connector of the smart outlet and the connection mechanism.

2. The method of claim 1, wherein the connection mechanism is prevented from relaying the power to the device while the smart outlet is in the inactive state.

3. The method of claim 1, further comprising:
transmitting, by the smart outlet, the identification information associated with the device and outlet identification information to the monitoring center associated with the controlled environment.

4. The method of claim 3, wherein the smart outlet is configured to transmit the identification information to the monitoring center over a powerline network connecting the smart outlet to the monitoring center within the controlled environment.

5. The method of claim 1, further comprising:
receiving, via the connection mechanism, by the smart outlet, user identification information associated with a user operating the device, wherein determining whether the device is authorized to receive the power from the smart outlet is further based on the user identification information.

6. The method of claim 5, wherein the user identification information comprises at least one of facial data, fingerprint data, or voice data.

7. The method of claim 5, wherein the user identification information is received in response to the smart outlet transmitting a query to the device, wherein the query is configured to be processed by a customized program installed in the device.

8. A smart outlet for detecting contraband within a controlled environment, comprising:
a universal serial bus (USB) connector;
a memory; and
a processor coupled to the memory, the processor configured to perform operations comprising:
detecting, by the smart outlet, a connection between a connector of the smart outlet and a connection mechanism of a power cable, wherein the power cable is configured to be connected to a device via a Universal Serial Bus (USB) connection;

receiving, by the smart outlet, identification information associated with the device;

receiving, by the smart outlet and pushed from a monitoring center associated with the controlled environment, one or more rules for relaying power through the smart outlet, wherein at least one of the one or more rules indicates one or more authorized locations in the controlled environment in which the device is authorized to receive the power;

retrieving, based on the identification information associated with the device, the at least one of the one or more rules associated with the device;

determining, by the smart outlet, whether the device is authorized to receive the power via the connection mechanism based on determining the one or more authorized locations in the controlled environment indicated by the at least one of the one or more rules matching location information of the smart outlet;

activating the smart outlet from an inactive state to an active state in response to the device being authorized; and relaying, after the smart outlet is activated to the active state, the power from the smart outlet through the connector of the smart outlet and the connection mechanism.

9. The smart outlet of claim 8, wherein the connection mechanism is prevented from relaying the power to the device while the smart outlet is in the inactive state.

10. The smart outlet of claim 8, wherein the operations further comprise:
transmitting, by the smart outlet, the identification information associated with the device and outlet identification information to the monitoring center associated with the controlled environment.

11. The smart outlet of claim 10, wherein the smart outlet is configured to transmit the identification information to the monitoring center over a powerline network connecting the smart outlet to the monitoring center within the controlled environment.

12. The smart outlet of claim 8, wherein the operations further comprise:
receiving, via the connection mechanism, by the smart outlet, user identification information associated with a user operating the device, wherein determining whether the device is authorized to receive the power from the smart outlet is further based on the user identification information.

13. The smart outlet of claim 12, wherein the user identification information comprises at least one of facial data, fingerprint data, or voice data.

14. The smart outlet of claim 12, wherein the user identification is received in response to the smart outlet transmitting a query to the device, wherein the query is configured to be processed by a customized program installed in the device.

15. A non-transitory computer readable medium having instructions stored therein, which when executed by a processor in a smart outlet configured to provide power within a controlled environment, cause the processor to perform operations, the operations comprising:
detecting, by the smart outlet, a connection between a connector of the smart outlet and a connection mechanism of a power cable, wherein the power cable is configured to be connected to a device via a Universal Serial Bus (USB) connection;

receiving, by the smart outlet, identification information associated with the device;

receiving, by the smart outlet and pushed from a monitoring center associated with the controlled environment, one or more rules for relaying the power through the smart outlet, wherein at least one of the one or more rules indicates one or more authorized locations in the controlled environment in which the device is authorized to receive the power;

retrieving, based on the identification information associated with the device, the at least one of the one or more rules associated with the device;

determining, by the smart outlet, whether the device is authorized to receive the power via the connection mechanism based on determining the one or more authorized locations in the controlled environment indicated by the at least one of the one or more rules matching location information of the smart outlet;

activating the smart outlet from an inactive state to an active state in response to the device being authorized; and relaying, after the smart outlet is activated to the active state, the power from the smart outlet through the connector of the smart outlet and the connection mechanism.

16. The non-transitory computer readable medium of claim 15, wherein the connection mechanism is prevented from relaying the power to the device while the smart outlet is in the inactive state.

17. The non-transitory computer readable medium of claim 15, the operations further comprising:

transmitting, by the smart outlet, the identification information associated with the device and outlet identification information to the monitoring center associated with the controlled environment.

18. The non-transitory computer readable medium of claim 17, wherein the smart outlet is configured to transmit the identification information to the monitoring center over a powerline network connecting the smart outlet to the monitoring center within the controlled environment.

19. The non-transitory computer readable medium of claim 15, the operations further comprising:

receiving, via the connection mechanism, by the smart outlet, user identification information associated with a user operating the device, wherein determining whether the device is authorized to receive the power from the smart outlet is further based on the user identification information.

20. The non-transitory computer readable medium of claim 19, wherein the user identification information comprises at least one of facial data, fingerprint data, or voice data.

* * * * *